US006567591B2

(12) United States Patent
Hoch

(10) Patent No.: US 6,567,591 B2
(45) Date of Patent: May 20, 2003

(54) SUBMARINE CABLE AND METHOD FOR THE MANUFACTURE THEREOF

(75) Inventor: Matthias Hoch, Nordenham (DE)

(73) Assignee: Norddeutsche Seekabelwerke GmbH & Co. KG, Nordenham (DE)

(*) Notice: Subject to any disclaimer, the term of this patent is extended or adjusted under 35 U.S.C. 154(b) by 8 days.

(21) Appl. No.: 09/747,404

(22) Filed: Dec. 21, 2000

(65) Prior Publication Data

US 2001/0016103 A1 Aug. 23, 2001

(30) Foreign Application Priority Data

Dec. 27, 1999 (DE) ........................................ 199 63 205

(51) Int. Cl.[7] .................................................. G02B 6/44

(52) U.S. Cl. ........................ 385/107; 385/102; 385/100

(58) Field of Search .................................. 385/100–114

(56) References Cited

U.S. PATENT DOCUMENTS 5,892,874 A * 4/1999 Houghton .................. 385/113

FOREIGN PATENT DOCUMENTS

GB 2138523 A 10/1984

* cited by examiner

*Primary Examiner*—Phan T. H. Palmer
(74) *Attorney, Agent, or Firm*—Technoprop Colton LLC

(57) ABSTRACT

Submarine cables (10, 11) have armouring (18, 19) surrounding the cable core (12), which armouring protects the cable core (12) particularly from mechanical loads. The armouring (18) is designed so that it can withstand the mechanical stresses to which the submarine cable (10, 11) is subjected when laid at the greatest depths provided for. Such armouring (18) is overdimensioned in areas of lesser depths. The invention provides for a submarine cable (10, 11), and a method for the manufacture thereof, a corresponding number of armouring wires (25) used to form the armouring (18) being replaced as necessary by filler strands (31).

18 Claims, 3 Drawing Sheets

SUBMARINE CABLE AND METHOD FOR THE MANUFACTURE THEREOF

BACKGROUND OF THE INVENTION

The invention relates to a cable, especially a submarine cable, with a cable core having at least one conductor and with armoring surrounding the cable core, which armoring has armoring wires, or with a cable core having at least one conductor and with armoring surrounding the latter and composed of a plurality of armor sections, which have armoring wires. The invention further relates to a method for the manufacture of a cable, especially a submarine cable, a continuous cable core being provided with at least one outer armoring.

PRIOR ART

In addition to a cable core having predominantly metal and/or optical conductors cables have armouring composed of one or more armour layers surrounding the said core. The armouring absorbs mechanical stresses acting on the cable. The armouring serves, particularly in the case of submarine cables, to protect the cable core with the conductors from the mechanical loads that occur when laying and taking up cables, bringing them ashore and burying them or the like. In ocean areas with rocky, dissected seabed in the region of underwater mountain ranges with steep inclines, and also in shallower waters used for fishing and for anchorage on the routes proposed for bringing cables ashore, submarine cables are protected by additional armour layers.

The armouring, particularly on submarine cables that are laid on routes with different depths of water and/or changing seabed formation, is not exposed to the same loading everywhere over the continuous length of the cable. Since the structure of the armouring on continuous submarine cables has always to be designed as a function of the maximum load, however, the armouring is overdimensioned on longitudinal sections subject to less loading.

Forming cables, and in particular submarine cables, from assembled cable sections that have one or more armour layers depending on the loading in order to adapt to different mechanical loads is already known. For this purpose the cable sections of differing structure must be joined to one another at their opposing ends. This is done by means of additional jointing sleeves or splices between the adjoining ends of differently structured cable sections.

BRIEF SUMMARY OF THE INVENTION

Proceeding from this, the object of the invention is to create a cable, in particular a submarine cable, which has a structure suited to the local requirements. Another object of the invention is to create a simple method for the manufacture of such a cable, in particular a submarine cable.

A cable for achieving the stated object has the characteristic features of a continuous cable core having at least one conductor and with armouring surrounding the cable core. Owing to the fact that individual armouring wires are replaced, at least in some areas, by filler strands composed of a less tensile and/or flexurally lax material, especially lighter material, an armouring can be created, which if adapted to the prevailing mechanical loads acting on the cable. The filler strands here serve practically only as gap fillers, which ensure that the armouring remains closed all around.

Owing to the fact that a greater or lesser number of armouring wires is replaced, as necessary, by filler strands in the longitudinal direction of the cable, the cable has armouring of differing load-bearing capacity along its length, which can be located to suit requirements by replacing a certain number of armouring wires with filler strands, section by section where fewer loads are exerted on the armouring. The filler strands do not absorb any significant mechanical loads. The possibility of forming the filler strands from a less tensile and/or flexurally lax material makes the cable lighter and less expensive.

The principle according to the invention of replacing the armouring wires by filler strands, as required, can be employed not only on submarine cables but on all conceivable types of cable and cable structures. At the same time the individual armouring wires and filler strands in the armouring may either run rectilinearly in the longitudinal direction of the cable, or be twisted and/or stranded.

A further cable for achieving the aforementioned object has the features of a continuous cable core having at least one conductor, with armouring surrounding the cable, and being composed of a plurality of amour sections. According to this the cable in the area of the armouring is formed from more than one and at least two armour sections, the cable core at least, however, being uninterrupted. The armouring of an armour section has at least one filler strand in at least one end area, which strand replaces a section of an armouring wire in the relevant end area of the armour section. Replacing one or even more armouring wires in the end area of at least one armour section with filler strands reduces the mechanical, external load bearing capacity of the relevant area of the cable towards the end of the armour section affected. All armouring wires of an armour layer of the armour section are preferably replaced by filler strands towards at least one end. At the end of such an armour section at least one outer armour layer then only has filler strands.

The armour sections suitably have different armouring for adapting the cable to different external loads. This applies in particular to submarine cables, which are laid, for example, at different depths and/or on seabeds of differing consistency (formation) In such a case the armour sections to be joined usually have a different number of armour layers. For example, an area of the cable subject to less loading has only a single armour layer, while an area subject to heavier loading has two (or even more) armour layers. In this case the outer armour layer of the armour section having more than one armour layer will preferably have a number of armouring wires diminishing in the longitudinal direction towards the end in the direction of the other armour section. Replacing these armouring wires by filler strands of preferably identical cross section means that the filler strands increase towards the end of the relevant armour section, possibly to such an extent that at the end of the armour section the outer armour layer only has filler strands. Due to the fact that the cross sections of the filler strands preferably correspond to those of the armouring wires, the external armour layer remains closed.

It is further proposed to join the filler strands replacing the armouring wires in certain sections to the respective armouring wire in the course of the respective cable, especially the uninterrupted cable core. The armouring wire that is removed in certain areas is thereby continued, that is to say extended in the longitudinal direction of the cable by the filler strand serving as spacer. The respective armouring wire is joined to the filler strand in particular by means that do not result in significant thickening of the joint. For example, a thin-walled tube is used. Bonding the opposing ends of the armouring wire and of the filler strand together is also feasible however.

A method for achieving the aforementioned object in which the armouring is formed from different armour sections. Due to the fact that the continuous cable core is provided with armouring, which is formed from different armour sections, armouring can be formed that is suited to the requirements. Where the mechanical loads on the cable are smaller, because a submarine cable is laid at shallower depths and buried, for example, an armour section with a smaller number of armouring wires can be used. In areas subjected to greater loads on the other hand, the armouring has the armour sections with a larger number of armouring wires. A cable, in particular submarine cable, can thus be formed, which has armouring of differing load bearing capacity in different areas. In the case of submarine cables the armour sections are suitably selected and located so as to produce armouring suited to the prevailing requirements, the armouring on submarine cables in particular being adapted to the depth-profile of the cable route.

Due to the fact that sections of at least some armouring wires or whole armouring wires of at least one selected armour section are replaced by filler strands and the filler strands are joined to armouring wires of another armour section or those armouring wires, sections of which are replaced and filled by the filler strands, any length and number of heavier and more rigid armouring wires can be replaced, as necessary, by lighter and in particular flexurally lax filler strands. At the same time the filler strands fill the spaces left by the replaced sections of the armouring wires in the relevant armour layer and hold the remaining armouring wires in the armour layer together. The armouring wires with the filler wires thereby form an altogether closed armour layer, so that the manufactured cable retains its shape.

According to a preferred development of the method the armouring wires, preferably of an outer armour layer, are increasingly replaced by filler strands towards the end of the respective armour section, to such an extent that at the end of an armour section at least the outer armour layer has only filler strands, which may possibly overlap the single (inner) armouring of the adjoining armour section by a short distance. By virtue of their flexurally lax characteristics, the filler strands exclusively present in the outer armour layer at the end of the relevant armour section guarantee cohesion of the outer armour layer at the end of the armour section, so that the filler strands of the outer armour layer do not burst open.

The ends of the filler strands of the outer armour layer are preferably held together by a binding band, for example a wrapping composed of high-tensile fibers preferably over the entire transitional area between adjacent armour sections, In order to form a continuous transition the said binding band or wrapping may extend over the adjoining end area of the adjacent armour section that has a smaller cross section owing to the absence of an armour layer.

BRIEF DESCRIPTION OF THE DRAWINGS

Preferred examples of embodiments of the invention will be explained in more detail below with reference to the drawing, in which.

DETAILED DESCRIPTION OF THE PREFERRED EMBODIMENT

Figure 1:
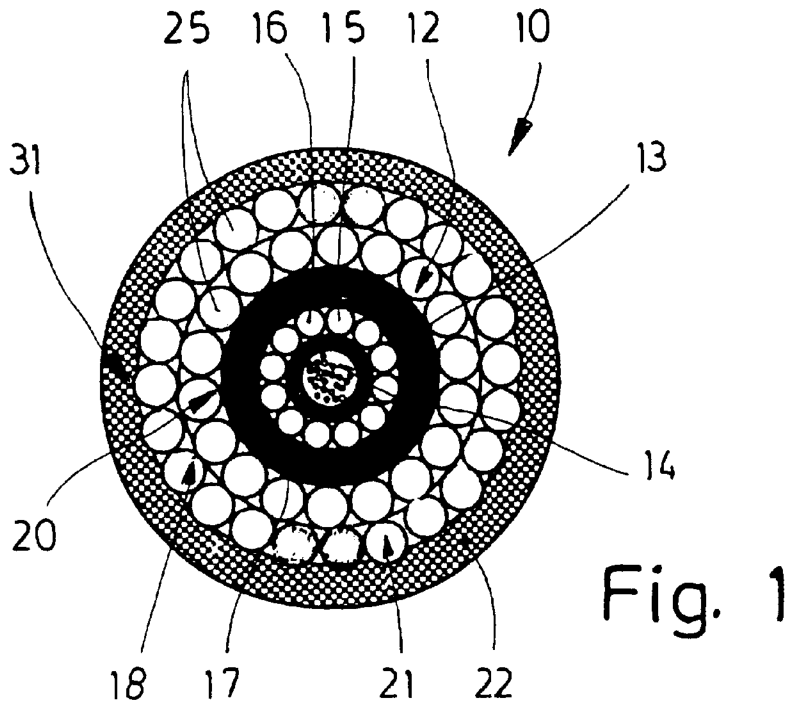
FIG. 1 shows a cross section through one type of a submarine cable.
Figure 2:
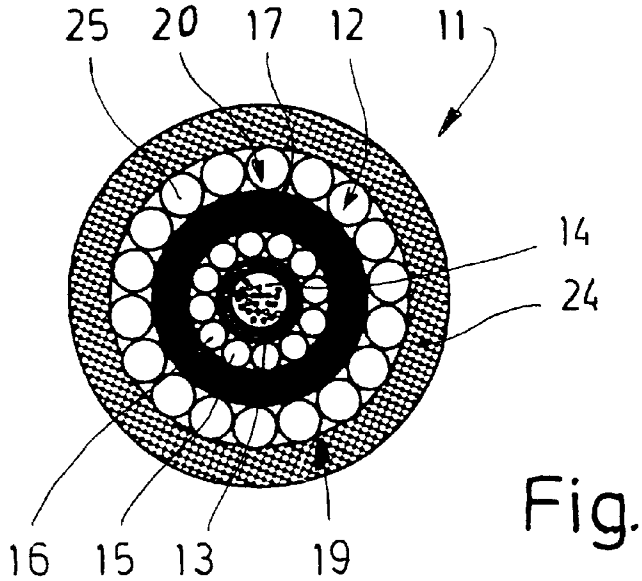
FIG. 2 shows a cross section through another type of a submarine cable.
Figure 3:
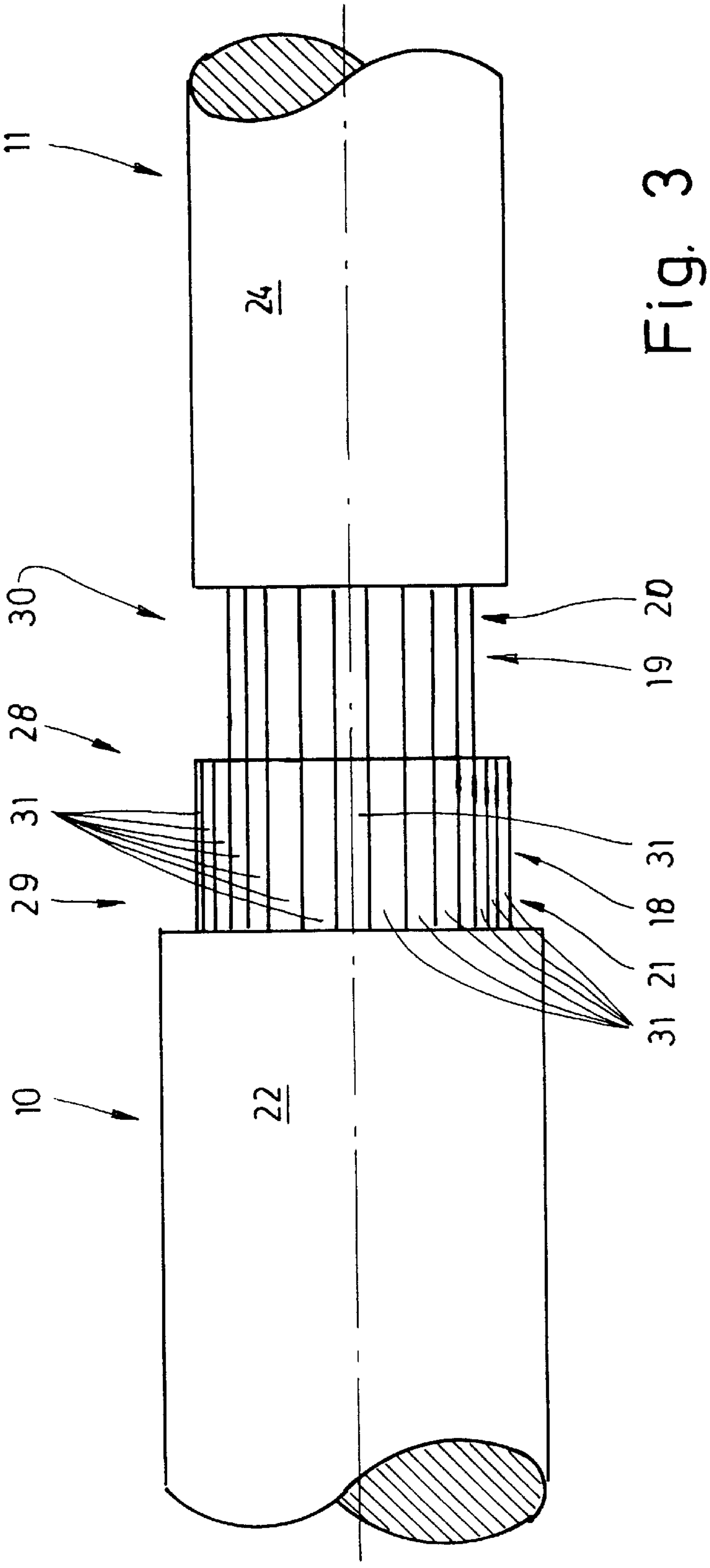
FIG. 3 shows a side view of a joint between two armour sections of different structure in a submarine cable.

Examples of the invention will be explained with reference to different submarine cables, FIG. 1 shows a cross section through a submarine cable 10 with a structure known in the art. FIG. 2 represents a cross section through a submarine cable 11 with another structure basically of known type.

The submarine cables 10 and 11 have a basically identical internal structure. In this respect the same reference numbers are used for both submarine cables 10 and 11. The identically designed cable cores 12 of the submarine cables 10 and 11 have a central casing tube 13. In the example of an embodiment shown, a plurality of optical conductors, namely optical waveguides 14, is loosely arranged in a manner known in the art. The remaining space in the casing tube 13 may be filled by a highly viscous, free-flowing filler compound. The casing tube 13 is surrounded by an armour layer 15 composed of a plurality of identical armouring wires 16. The metal armouring wires 16 are arranged immediately contiguous with one another in the armour layer 15, so that they produce a closed sheath around the casing tube 13. Finally the cable core 12 has an inner covering 17 composed of an insulating material, for example plastic, in particular polyethylene. The inner covering 17 isolates the cable core 12 electrically from the parts of the submarine cables 10 and 11 arranged around the cable core 12, and thereby, when laid, from the seabed.

Each of the two submarine cables 10 and 11 has armouring 18 and 19. The armourings 11 and 19 are of different design in the submarine cables 10 and 11. In the submarine cable 10 the armouring 18 is formed from two armour layers 20 and 21. An inner armour layer 20 surrounds the inner covering 17 of the cable core 12. The outer armour layer 21 surrounds the inner armour layer 20. The outer armour layer 21 is preferably surrounded by an outer covering 22, which is formed from plastic or a plastic-like material (for example polypropylene yarn).

The submarine cable 11 differs from the submarine cable 10 in that the armouring 19 has only one single armour layer. This armour layer corresponds to the inner armour layer 20 of the submarine cable 10 and is accordingly given the same reference number. The single armour layer 20 of the submarine cable 11 is in turn surrounded by an outer covering 24, which serves to protect the submarine cable 11 and is formed from the same material as the outer covering 22.

The armour layers 20 and 21 are formed from the same circular armouring wires 25. These are composed, for example, of steel, special steel or aluminium. The armouring wires 25 are arranged in a closed layer around the cable core 12, so that the armour layers 20 and 21 form closed protective sheathes around the cable core 12. The armour layers 20 and 21 of the submarine cable 10 have different diameters. These come about, despite the equal diameter of the armouring wires 25, due to the fact that the outer armour layer 21 has a greater number of armouring wires 25 than the inner armour layer 20. The armouring wires 25 of individual or all armour layers 20 and 21 are preferably stranded in a manner known in the art. This also applies to the armouring wires 16 for forming the armour layer 15 in the cable core 12 of the submarine cable 10 and/or 11.

In order not to have to provide the entire submarine cable with armouring capable of withstanding the laying tension that occurs at the greatest depth in the case of submarine cables, which are laid along an irregular cable route at differing depths, the submarine cable has different armourings. In the example of an embodiment shown these are the armourings 18 and 19. Armour sections of the armourings 18 and 19 are distributed over the length of the submarine cable in a manner suited to the requirements, in particular in conformity with the cable route. In this one and the same cable core 12 runs uninterrupted over the entire length of the submarine cable, that is continuously over the individual successive armour sections. Where the armour section is designed as the armouring 18, the submarine cable has a cross section like the submarine cable 10 shown in FIG. 1. Where the armour section has the armouring 19, the submarine cable is designed with a cross section like the submarine cable 11 in FIG. 2. The differing armour sections successively arranged on the continuous, uninterrupted cable core 12 preferably have continuous armouring wires 25 in the inner armour layer 20. The armouring wires 25 may also conceivably extend only over the respective armour section, however, and be joined to one another in the transitional area 28. The outer armouring 19 of the armour section having two armourings 18, 19 terminates in the transitional area 28 between successive armour sections.

According to the invention a corresponding number of armouring wires 25 is replaced by filler strands 31 along those armour sections of the submarine cable 10 or 11, in which the armouring 18, 19 is not subjected to full loading. Preferably only armouring wires 25 of the outer armour layer 21 are replaced by filler strands 31. A greater or smaller number of armouring wires 25 is replaced by filler strands 31, at least in some sections, depending on the loading condition of the submarine cable 10. It is feasible to replace only one section of a single armouring wire 25 by a corresponding section of a filler strand 31. It is also possible, however, to replace at least sections of all armouring wires 25 or all armouring wires completely, preferably of the outer armour layer 21, by filler strands 31.

By varying the number of armouring wires 25 to be replaced, the length of the sections of the armouring wires 25 to be replaced, and the positioning of these sections along the overall length of the submarine cable 10 it is possible, by means of corresponding filler strands 31, to adapt the armouring 18 of the submarine cable 10 individually to the requirements. The armouring 18 then has a load bearing capacity suited to the demands, dimensioning over and above the necessary safety margin thereby being eliminated. FIG. 1 shows a cross section through an area of the submarine cable 10, in which four armouring wires 25 are replaced by filler strands 31. In each case two adjacent filler strands 31 are arranged on diametrically opposing areas of the outer armour layer 21.

The filler strands 31 are formed from a less tensile material, which is additionally or alternatively flexurally lax. Filler strands 31 formed from plastic meet these requirements. These may be non-reinforced thermoplastics or reinforced plastics, especially fiber-reinforced plastics, for example glass fiber-reinforced plastics. Such filler strands 31 are lighter than the armouring wires 25, so that the weight of the submarine cable 10 can be reduced by adapting the armouring 18 to the prevailing pressure conditions.

It is furthermore proposed, where a plurality of armouring wires 25 is to be replaced, to provide a gradually increasing number of filler strands 31 replacing the armouring wires 25 in the longitudinal direction of the submarine cable 10. All filler strands 31 or groups of multiple filler strands 31 are then of different length. In this way the mechanical load bearing capacity of the armouring 18 in the longitudinal direction of the submarine cable 10 is gradually increased or reduced. As a result a substantially continuous transition is produced between armourings 18 capable of bearing different pressure loads.

The armouring wires 25 are replaced by filler strands during manufacture of the submarine cable 10, by removing the armouring wire 25 in places where a respective armouring wire 25 or a section thereof is to be replaced by a filler strand 31. The space formerly occupied by the section of the respective armouring wire 25 is then taken up by a corresponding filler strand 31. For this purpose the respective filler strand 31 has dimensions, in particular a cross section, which corresponds or is at least similar to the cross section of the armouring wire 25 replaced. If a round armouring wire 25 of a certain diameter it to be replaced, the corresponding filler strand 31 also has a round cross section of equal or approximately equal diameter. As soon as a section, over the length of which the armouring wire 25 is replaced by the filler strand 31, ends, the filler strand 31 is cut off and is again succeeded by the armouring wire 25 in the longitudinal direction of the submarine cable 10. Armouring wires 25 of specific length are in each case therefore replaced by filler strands 31 of equal length.

Figure 4:
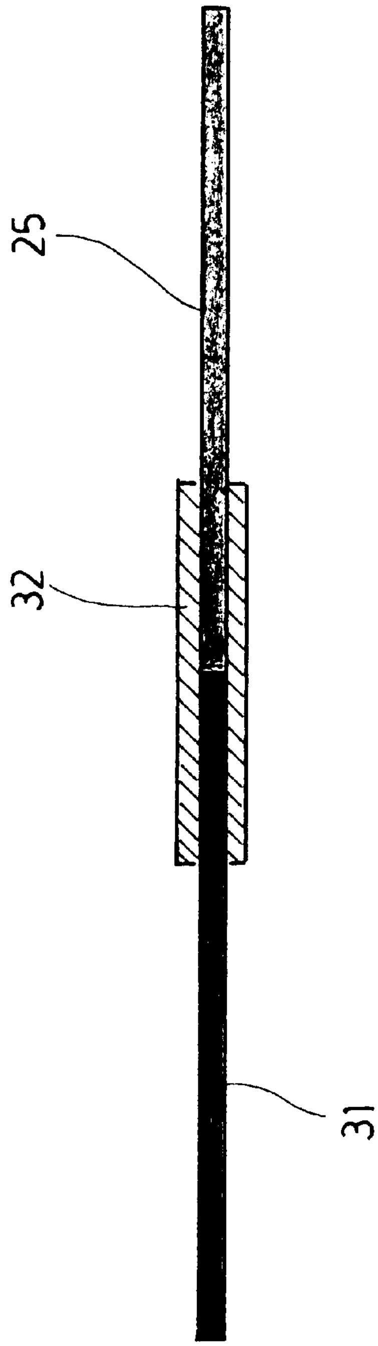
FIG. 4 shows a joint between an armouring wire and a filler strand in a longitudinal section.

Where, inside the armouring 18, a filler strand 31 follows an armouring wire 25 or an armouring wire 25 is again arranged in succession to a filler strand 31, the opposing ends of the respective armouring wire 25 and of the filler strand 31 assigned thereto are joined. This joint may be achieved by means of a tubular section, namely a thin-walled sleeve 32 (FIG. 4). The sleeve 32 may be formed from various materials. It is preferably composed of a material that is compatible with the material of the respective armouring wire 25, for example special steel, especially stainless steel. Short end areas of the armouring wire 25 and of the filler strand 31 to be joined thereto are inserted so far into the sleeve 32 from opposite sides that the opposing ends of the armouring wire 25 and the filler strand 31 meet or virtually abut one another approximately in the middle of the sleeve 32. The joining of the armouring wire 25 to the respective filler strand 31 through the sleeve 32 is secured by localized plastic deformation of the sleeve 32, for example by pinching the latter. A thin-walled design of the sleeve 32, the wall thickness of which is drawn thicker in FIG. 4 merely for representational purposes, means that there is only a slight enlargement of the diameter causing scarcely any interference at the point where the armouring wire 25 is joined to the filler strand 31.

According to a further example of an embodiment of the invention the submarine cable is made up of a plurality of different armour sections, the cable core 12, however, running continuously. The armouring 18 and the armouring 19 alternate with one another, so that successively different armour sections are produced, There are in this case no limits to the number of different armour sections. Submarine cables 10 and 11 with different armourings 18, 19 may repeatedly succeed one another, for example. The position and the length of the respective armour sections correspond to the course, in particular the depths of water, the condition of the seabed and the route over which the submarine cable is to be laid. That area of the assembled submarine cable, which has an armour section with armouring 19 composed of only one armour layer 20, is then situated in areas of low loading. By contrast, in areas of greater loading there is an armour section with the stronger armouring 18 composed of two armour layers 20 and 21. Other armour sections can be combined with one another, however, especially those which have armourings that differ from the submarine cables 10 and 11 in their structure, number of armour layers and the cross section of the armouring wires 25.

Where the armour sections with different armourings 18 and 19 meet, the thicker armour section with two armour layers 20 and 21 has filler strands 31. Filler strands 31 are preferably present only in one or both end areas 29 of the outer armour layer 21.

Proceeding from the end of the outer armour layer 21 the filler strands 31 thereof are gradually replaced again by armouring wires 25, that is along a transitional section along the longitudinal axis of the continuous cable core 12. This can be done for each individual filler strand 31 or each individual armouring wire 25, or in groups of multiple filler strands 31 or armouring wires 25. For example, a short distance from the end of the submarine cable 10 short sections of two filler strands 31 situated diametrically opposite on another on the circumference of the armour layer 21 are replaced by armouring wires 25, and in each case at certain intervals in succession to one another two further filler strands 31, that is the filler strands 31 adjacent to the filler strands 31 already replaced, are continued by armouring wires 25. This may be continued until the entire outer armour layer 21 is again composed entirely of armouring wires 25. In this way a continuous transition from filler strands 31 to armouring wires 25 is created, thereby increasing the load-bearing capacity of the outer armour layer 21 along an area of the submarine cable 10 adjoining the end.

Forming the outer armour layer 21 at the end of the submarine cable 10 exclusively from filler strands 31 ensures good cohesion of the filler strands 31, formed from a flexurally lax plastic, in the outer armour layer 21. In order to even out the transition of the filler strand 31, truncated in the transitional area 28, of the outer armour layer 21 of an armour section to an armour section with only one armour layer 20 (FIG. 2), the ends of the filler strands 31 can be flattened or facetted by softening. In this way the ends of the filler strands 31 can be welded at the end of the outer armour layer 21 of the submarine cable 10, so that the filler strands 31 are reliably held together in the outer armour layer 21. Wrapping the filler strands 31 in order to ensure their cohesion in the outer armour layer 21 may then be dispensed with.

The invention is suited to any types of cable, not just the submarine cables 10 and 11 shown by way of example in the figures. A submarine cable with the appropriate length and defined, varying armouring is produced from a plurality of differing successive armour sections on the continuous cable core. Thus a submarine cable can be manufactured with armouring adapted to the prevailing conditions.

What is claimed is:

1. A submarine cable, with a continuous cable core having at least one conductor and with a length of armouring that surrounds the cable core and has armouring wires, characterized in that along the length of the armoring individual armouring wires (25) are replaced in at least some portions of the armouring by filler strands (31) manufactured of a material having a lighter and a lower tensile strength than the armouring wires (25), with the number of filler strands (31) replacing the armouring wires (25) varying along the length of the armoring.

2. The cable according to claim 1 characterized in that the filler strands (31) have approximately the same cross section as the armouring wires (25).

3. The cable according to claim 1, characterized in that the filler strands (31) are formed from plastic.

4. The cable according to claim 1, characterized in that the number of filler strands (31) replacing the armouring wires (25) increases towards ends of the length of armouring in which the filler strands (31) replace the armouring wires (25).

5. The cable according to claim 1, characterized in that in the armouring (19) is composed of a plurality of armour layers (20, 21), one of which is an outer armour layer (21), and at least a portion of at least one of the armouring wires (25) in the outer armour layer (21) is replaced by the filler strand (31).

6. The cable according to claim 1, characterized in that the filler strands (31) are joined to the armouring wires (25).

7. A submarine cable with a cable core having at least one conductor, an armouring that surrounds the cable core and a plurality of armouring sections each having a plurality of armouring wires arranged into at least an outer armouring layer, with at least one armouring section having a different number of armouring layers than at least another armouring section, characterized in that in at least one of the plurality of armouring sections at least some of the plurality of armouring wires (25) of the outer armouring layer (21) of the armouring (19) are replaced by filler strands (31) manufactured of a material having a lighter weight and a lower tensile strength than the armouring wires (25).

8. The cable according to claim 7, characterized in that at an end of the at least one armouring section having the filler strands (31) proximal to a succeeding armouring section all armouring wires (25) of the outer armouring layer (21) are replaced by filler strands (31).

9. The cable according to claim 7, characterized in that the filler strands (31) have approximately the same cross section as the armouring wires (25).

10. The cable according to claim 7, characterized in that the number of filler strands (31) replacing the armouring wires (25) varies along the length of the at least one armouring section and the number of filler strands (31) replacing the armouring wires (25) increases towards ends of the at least one armouring section.

11. The cable according to claim 7, characterized in that the filler strands (31) extend up to an end of the at least one armouring section having the filler strands (31) proximal to an end of another of the plurality of armouring sections.

12. The cable according to claim 7, characterized in that the filler strands (31) are arranged in the outer armouring layer (21) of the plurality of armouring sections that has at least one armouring layer (21) more that the another of the plurality of armouring sections.

13. The cable according to claim 7, characterized in that the filler strands (31) are joined to the armouring wires (25).

14. The cable according to claim 7, characterized in that the filler strands (31) are formed from plastic.

15. A method for the manufacture of a submarine cable having a continuous cable core over a predetermined length and armouring having at least one outer armouring layer, characterized by the steps of forming the armouring (19) from a plurality of armouring sections having a varying number of armouring layers (20, 21) composed of armouring wires (25), replacing the armouring wires (25) of at least one part of the armouring layers (20, 21) in at least one of the armouring sections with filler strands (31) in the region of an end of the at least one of the armouring sections proximal to another of the plurality of armouring sections.

16. The method according to claim 15, characterized in end sections of at least some of the armouring wires (25) in the at least one outer armour layer (21) are replaced by the filler strands (31).

17. The method according to claim 15, characterized in that sections of the armouring wires (25) in the longitudinal direction of the cable are gradually replaced by the filler strands (31), individual longitudinal sections of the filler strands (31) being of different length.

18. The method according to claim 15, characterized in that some of the armouring sections that have a greater number of armouring layers (20, 21) a successively greater number of armouring wires (25) of the outer armouring layer (21) are replaced section by section.

* * * * *